J. BIRKS.
Weighing-Scoop.

No. 212,786. Patented Mar. 4, 1879.

UNITED STATES PATENT OFFICE.

JOHN BIRKS, OF OGDENSBURG, NEW YORK, ASSIGNOR TO GEORGE BIRKS, OF PRESCOTT, CANADA.

IMPROVEMENT IN WEIGHING-SCOOPS.

Specification forming part of Letters Patent No. 212,786, dated March 4, 1879; application filed November 15, 1878.

*To all whom it may concern:*

Be it known that I, JOHN BIRKS, of Ogdensburg, in the county of St. Lawrence and State of New York, have invented a new and Improved Measuring and Weighing Scoop, of which the following is a specification:

The object of my invention is to furnish a measuring-scoop which will indicate both the weight and bulk of its contents, and be also adapted for use as a spring-balance to weigh anything which cannot be placed in the scoop.

The invention consists in a scoop provided with marks of liquid-measure, to show the quantity of any article which may be put into it and adapted to being measured in that way, which scoop has its handle constructed as a spring-balance, that indicates the weight of the contents, and is further provided with a hook, so that the balance can be used to weigh articles placed upon the hook.

Figure 1:
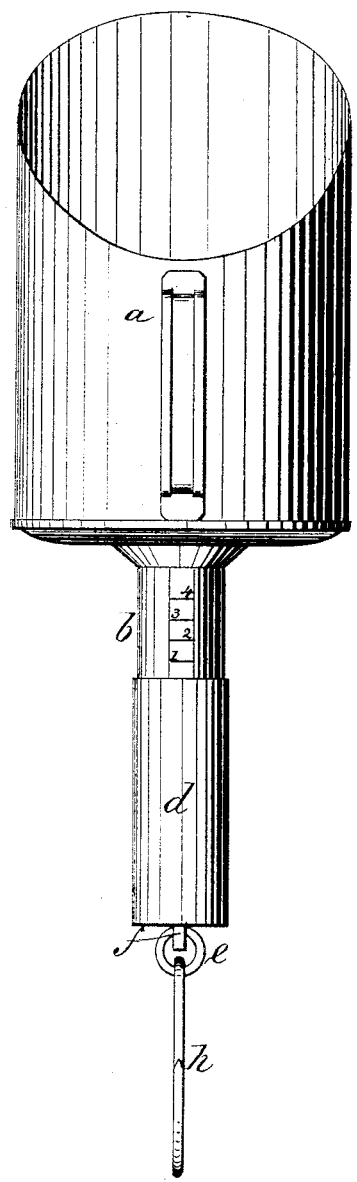
Figure 2:
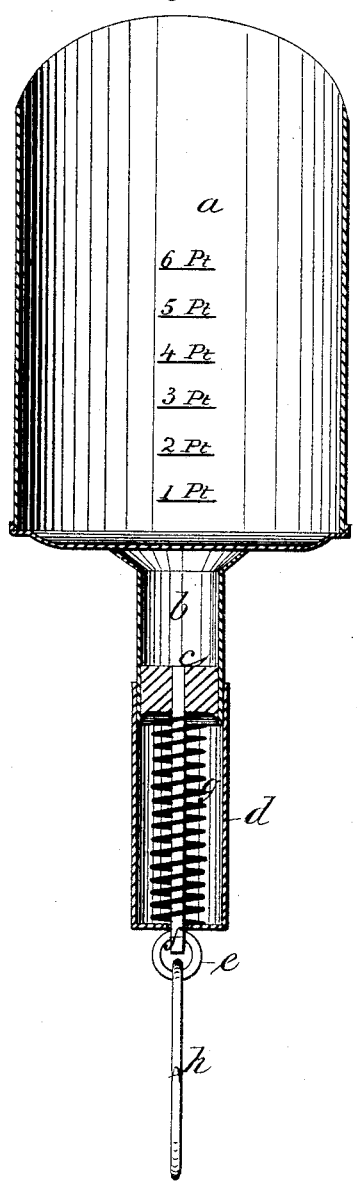

In the accompanying drawings, Figure 1 is an elevation of my improved apparatus. Fig. 2 is a vertical section.

Similar letters of reference indicate corresponding parts.

The scoop $a$ is of the usual cylindrical shape and size, and preferably made of sheet metal. Upon one side the metal is indented or marked to indicate, by pints, the quantity of anything placed in it, each mark being numbered in its proper order, as shown.

$b$ is a metal tube, similar to and attached in the same manner as the handles applied to scoop, except that its end is closed by a plug, $c$, securely fixed in place. Around the outside of tube $b$ is a second tube, $d$, adapted to move telescopically on tube $b$, and prevented from disconnection by a ring, $e$, on the rod $f$, that extends from plug $c$ through the closed end of tube $d$. This rod $f$ is made with flat sides, so as to prevent tube $d$ from turning on $b$.

$g$ is a spiral spring, of brass or steel, in the tube $d$ around rod $f$, and acting to retain tube $d$, extended to its full extent.

The tubes $b$ $d$ together serve as a handle for using the scoop in the usual manner. When the contents of the scoop are to be weighed the scoop is to be held wholly by tube $d$, and tube $b$ will be pressed down more or less, according to the weight. The side of tube $b$ is provided with a scale, indicating pounds, as seen in Fig. 1, which indicates the weight.

To ring $e$ is connected a hook, $h$, or other suitable device, which permits the balance to be used for weighing any article placed on the hook. The scoop in that case will be held in the manner described, and the weight will be indicated by the same scale; and, if desired, the rod $f$ may have upon it a corresponding scale.

It is evident that the scoop and balance may be made of any capacity adapted for general use; and it is to be understood that the parts are to be put together with the spring under proper tension for correct indications.

Having thus described my invention, I claim as new and desire to secure by Letters Patent—

1. The combination, with a scoop and hook, of an intermediate spring-balance having a top-open and bottom-closed tube, $d$, that allows the scoop-handle $h$ to slide therein, and thus weighs from either end, as shown and described.

2. The inner tube, $b$, held to an outer tube, that is bottom-closed by the plug $c$, ring $e$, rod $f$, and spring $g$, as and for the purpose specified.

3. The combination, with the scoop $a$, and tubes $b$ $d$, forming the handle of the scoop, of the rod $f$, spring $g$, and hook $h$, or similar device, substantially as shown and described, and for the purposes set forth.

JOHN BIRKS.

Witnesses:
C. E. WATERMAN,
E. C. WATERMAN.